· US007778987B2

(12) United States Patent
Hawkins

(10) Patent No.: US 7,778,987 B2
(45) Date of Patent: Aug. 17, 2010

(54) LOCALLY STORING WEB-BASED DATABASE DATA

(75) Inventor: Jonathan C. Hawkins, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 964 days.

(21) Appl. No.: 11/539,563

(22) Filed: Oct. 6, 2006

(65) Prior Publication Data
US 2008/0086477 A1     Apr. 10, 2008

(51) Int. Cl.
*G06F 17/30* (2006.01)
(52) U.S. Cl. ................... 707/705; 707/709; 707/781; 707/E17.032; 707/E17.117; 707/999.01
(58) Field of Classification Search ................ None
See application file for complete search history.

(56) References Cited

U.S. PATENT DOCUMENTS

| | | | |
|---|---|---|---|
| 6,131,096 A | 10/2000 | Ng et al. | |
| 6,202,023 B1 | 3/2001 | Hancock et al. | |
| 6,594,682 B2 | 7/2003 | Peterson et al. | |
| 6,701,352 B1 | 3/2004 | Gardner et al. | |
| 6,772,225 B1 | 8/2004 | Jennings, III et al. | |
| 6,801,927 B1 | 10/2004 | Smith et al. | |
| 7,024,420 B2 | 4/2006 | Ball et al. | |
| 7,039,929 B2 | 5/2006 | Brotz | |
| 7,043,606 B2 | 5/2006 | Roskind | |
| 7,051,161 B2 | 5/2006 | Dixit et al. | |
| 7,054,900 B1 * | 5/2006 | Goldston | 709/203 |
| 7,076,500 B2 | 7/2006 | Gallant et al. | |
| 7,457,828 B2 * | 11/2008 | Wenner et al. | 707/201 |
| 2003/0182357 A1 | 9/2003 | Chess et al. | |
| 2003/0195941 A1 * | 10/2003 | Amiri et al. | 709/214 |
| 2005/0097123 A1 * | 5/2005 | Baek | 707/102 |
| 2005/0197819 A1 | 9/2005 | Hopkins et al. | |
| 2007/0027838 A1 * | 2/2007 | Newport et al. | 707/2 |

OTHER PUBLICATIONS

Ari Luotonen, et al., "World-Wide Web Proxies", 8 pages, Apr. 1994, http://citeseer.ist.psu.edu/cache/papers/cs/3856/http:zSzzSzwww. ticl.co.ukzSzsecurityCDzSzdocszSzfirewallzSzwwwproxy.pdf/ luotonen94worldwide.pdf.
Kevin W. Froese, et al., "The Effect of Client Caching on File Server Workloads", pp. 150-159, 1996 IEEE, http://csdl2.computer.org/comp/proceedings/hicss/1996/7324/00/73240150.pdf.
Michael D. Dahlin, et al., "Cooperative Caching: Using Remote Client Memory to Improve File System Performance", 14 pages, 1994, http://citeseer.ist.psu.edu/cache/papers/cs/7286/ht-tp:zSzzSzguir.cs.berkeley.eduzSzprojectszSzosprelimszSzpapersz Szcoop-cach-remote.pdf/dahlin94cooperative.pdf.

*Primary Examiner*—Don Wong
*Assistant Examiner*—Andalib F Lodhi
(74) *Attorney, Agent, or Firm*—Workman Nydegger

(57) ABSTRACT

The present invention extends to methods, systems, and computer program products for locally storing Web-based database data. Embodiments of the present invention permit Web-based database data to be locally stored at a computer system to increase the efficiency of rendering the Web-based database data within a Web browser at the computer system. Web-based database data can be sandboxed per domain to mitigate (and possibly eliminate) the exposure of the Web-based database data to malicious computer systems. Space allocated to each domain can be initially set and then subsequently altered by a user.

19 Claims, 6 Drawing Sheets

LOCALLY STORING WEB-BASED DATABASE DATA

CROSS-REFERENCE TO RELATED APPLICATIONS

Not Applicable.

BACKGROUND

1. Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing components.

One common form of network based communication is exchanging electronic messages on the Worldwide Web ("WWW"). Content on the Worldwide Web is typically accessed in a client/server model. A "Web browser" of a client computer system sends a request to access content that is provided by a "Web Server" of a server computer system (e.g., by entering a Uniform Resource Locator ("URL") into the Web browser). If the user of the Web browser is authorized to access the content, the Web server typically provides the content to the Web browser. In a Web environment, content and requests for content, are frequently transported using Hypertext Transfer Protocol ("HTTP"). Web-based content can be provided in HyperText Markup Language ("HTML") pages, style sheets, images, scripts, etc.

Most, if not all Web browsers, cache portions of Web-based content in a common storage location (the browser cache) so that subsequent renderings of a Web page can be presented more efficiently. For example, when a Web browser receives a Web page from a Web server, the Web browser can locally cache portions of the content included in the Web page. Thus, if the Web browser is subsequently directed to the same Web page, the Web browser can check the common storage location for cached portions of content and any cached portions of content can be combined with other content received via the network to construct the Web page. Accordingly, using locally cached content potentially reduces the amount of data that is transferred over a network in order to display content from the Web server. As a result, Web pages can be rendered more quickly improving the user experience.

However, typically, even if only a portion of a Web page changes the entire page is reloaded over the network for display on a Web browser. For example it may be that a Web browser accesses a Web page, downloads content of the Web page via network communication, and caches content from the Web page. If the content of the Web page subsequently changes, the Web browser can be required to re-download the entire Web page even if only small portions of the Web page have changed.

Thus more recently, some Web browsers have implemented partial page updates to better utilize cached content. Content is re-downloaded when an applicable portion of a Web page changes. However, a Web browser is not necessarily required to re-download all the content of Web page in response to a change to a portion of the Web page. For example, when a single image in a Web page changes, the Web browser can detect the change and re-download the single image without having to re-download other cached content that has not changed.

Some Web-based applications also permit Web browsers to interact with data from a database (e.g., an SQL database). A Web server receives a request from a Web browser, accesses an appropriate portion of database data, and returns the database data to the Web browser. Depending on the configuration of the Web based application, a user may also be able to change portions of database data through the Web browser. For example, a user may be able to create and modify database records through the Web browser. In some environments, a user is able to implement SQL operations (CREATE TABLE, SELECT, INSET, UPDATE, DELETE, etc.) through a Web browser. Thus, a Web browser essentially provides a user-interface for manipulating database data over a network (e.g., the Internet).

However, there is typically no mechanism for a Web browser to appropriately cache tabular data (e.g., data from a database). Typically, a user does not access all the data within a database at any one time. Thus, caching any received database data provides an incomplete (and potentially non-functioning) data set. Further, since content is typically cached in a common location (the browser cache), caching database data from one Web site (or domain) potentially makes the cached database data available to any other Web site (or domain) the Web browser accesses. For example, cached corporate financial data is placed at risk when a Web browser is subsequently (and potentially unbeknownst to a user) directed to malicious Web site (that can then examine the browser cache).

Further, since many databases contain large quantities of data, locally caching database data could quickly fill up allocated browser cache space.

Additionally, most, if not all, browsers lack the ability to operate in an "offline" mode. That is, Web browsers typically can not present meaningful content when a Web site is unavailable (e.g., when no active network connection is detected or a corresponding Web server is down). For example, when a Web browser attempts to load a resource, such as, for example, an HTML page or image, from an unavailable Web server, the Web browser fails to render the resource (even if the resource is cached locally). Thus, even if database data (or any other type of content) were cached, the Web browser would be unable to present the database data (or other type of content) in an offline mode.

BRIEF SUMMARY

The present invention extends to methods, systems, and computer program products for locally storing Web-based database data. In some embodiments, a computer system caches tabular database for subsequent Web browser access. The computer system sends a Web based request to a Web server in a specified domain. The Web based request requests access to a Web page that includes a portion of a database that is stored in a database accessible to the Web server.

The computer system receives a portion of the database from the Web server. The computer system locally stores the received database portion at the computer system. The locally stored database portion is locally accessible to the Web browser such that data from the locally stored database portion can be locally provided to the Web browser without the data being included in network based communication. The computer system retains an indication that the database portion was received from the specified domain to prevent script code from Web servers in other domains from accessing the database portion.

In other embodiments, a computer system renders tabular database data within the Web browser. The computer system sends a Web based request to a Web server in a specified domain indicated by a specified domain name. The Web based request is for accessing a Web page that includes a portion of a database stored in a database accessible to the Web server.

The computer system receives a request from the Web server for access to a locally stored database portion that is stored locally at the computer system. The computer system accesses a stored domain name indicative of a domain that previously sent the locally stored database portion to the computer system. The computer system compares the specified domain name to the stored domain name. The computer system determines that the specified domain name and the stored domain name are sufficiently similar to allow responses from the Web server to include database data from the locally stored database portion. The computer system includes data from the locally stored database portion in a Web based response to the Web based request based on the determination. The computer system presents the Web based response including the data from the locally stored database portion at the Web browser.

In other embodiments, a computer system caches tabular database data at the computer system for subsequent Web browser access. The computer system sends a Web based request to a Web server in a specified domain. The Web based request requests access to a Web page that includes a portion of a database stored in a database accessible to the Web server.

The computer system receives a request from script code from the Web server to send the database portion to the computer system for local storage at the computer system. The computer system determines that the amount of storage space allocated to the specified domain for local storage is large enough to store the database portion. The computer system receives the database portion from the Web server. The computer system stores the received database portion at the computer system. The stored database portion is locally accessible to the Web browser such that data from the database portion can be locally provided to the Web browser without the data being including network based communication.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1A:
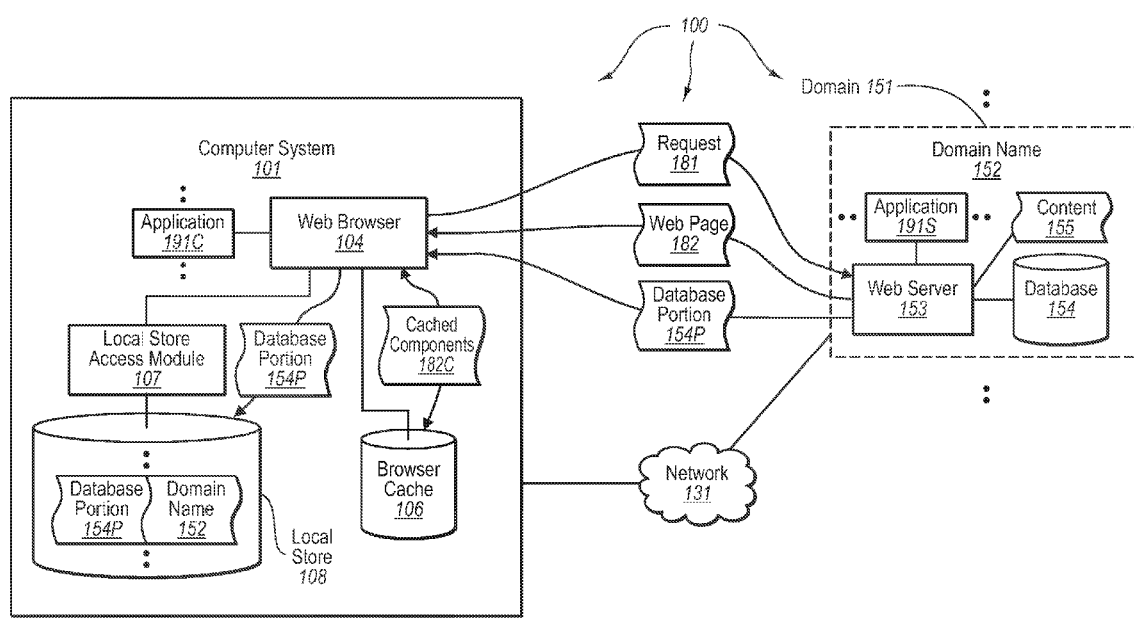
FIGS. 1A-1C illustrate an example computer architecture that facilitates locally storing Web-based database data.

The present invention extends to methods, systems, and computer program products for locally storing Web-based database data. In some embodiments, a computer system caches tabular database for subsequent Web browser access. The computer system sends a Web based request to a Web server in a specified domain. The Web based request requests access to a Web page that includes a portion of a database that is stored in a database accessible to the Web server.

The computer system receives a portion of the database from the Web server. The computer system locally stores the received database portion at the computer system. The locally stored database portion is locally accessible to the Web browser such that data from the locally stored database portion can be locally provided to the Web browser without the data being included in network based communication. The computer system retains an indication that the database portion was received from the specified domain to prevent script code from Web servers in other domains from accessing the database portion.

In other embodiments, a computer system renders tabular database data within the Web browser. The computer system sends a Web based request to a Web server in a specified domain indicated by a specified domain name. The Web based request is for accessing a Web page that includes a portion of a database stored in a database accessible to the Web server.

The computer system receives a request from script code from the Web server for access to a locally stored database portion that is stored locally at the computer system. The computer system accesses a stored domain name indicative of a domain that previously sent the locally stored database portion to the computer system. The computer system compares the specified domain name to the stored domain name. The computer system determines that the specified domain name and the stored domain name are sufficiently similar to allow responses from the Web server to include database data from the locally stored database portion. The computer system includes data from the locally stored database portion in a Web based response to the Web based request based on the determination. The computer system presents the Web based response including the data from the locally stored database portion at the Web browser.

In other embodiments, a computer system caches tabular database data at the computer system for subsequent Web browser access. The computer system sends a Web based request to a Web server in a specified domain. The Web based request requests access to a Web page that includes a portion of a database stored in a database accessible to the Web server.

The computer system receives a request from script code form the Web server to send the database portion to the computer system for local storage at the computer system. The computer system determines that the amount of storage space allocated to the specified domain for local storage is large enough to store the database portion. The computer system receives the database portion from the Web server. The computer system stores the received database portion at the computer system. The stored database portion is locally accessible to the Web browser such that data from the database portion can be locally provided to the Web browser without the data being including network based communication.

Embodiments of the present invention may comprise a special purpose or general-purpose computer including computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, computer-readable media can comprise physical (or recordable type) computer-readable storage media, such as, RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

In this description and in the following claims, a "network" is defined as one or more data links that enable the transport of electronic data between computer systems and/or modules. When information is transferred or provided over a network or another communications connection (either hardwired, wireless, or a combination of hardwired or wireless) to a computer, the computer properly views the connection as a computer-readable medium. Thus, by way of example, and not limitation, computer-readable media can also comprise a network or data links which can be used to carry or store desired program code means in the form of computer-executable instructions or data structures and which can be accessed by a general purpose or special purpose computer.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1A illustrates an example computer architecture 100 that facilitates locally storing Web-based database data. Computer architecture 100 includes computer system 101, network 131, and domain 152. Depicted in computer architecture 100 are various components including application 191C, Web browser 104, application 191S, and Web server 153. Each of the various components can be connected to network 131, such as, for example, a Local Area Network ("LAN"), a Wide Area Network ("WAN"), or even the Internet. Thus, the various components can receive data from and send data to other components connected to the network. Accordingly, the components can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network. For example, components can exchange Simple Object Access Protocol ("SOAP") envelopes containing Web service related data. In some embodiments, application 191C and application 191S are different portions of a distributed application, such as, for example, a Web services application.

Web browser 104 can be configured to request Web-based content from domains, such as, for example, domain 151, accessible via network 131. Web-based content can include text data, image data, audio/video data, etc. One or more Web-based applications, such as, for example, application 191C, can be configured to run within Web browser 104. A Web-based application can be a script and/or other computer-executable instructions. Web-based applications can request other types of data, such as, for example, database data, from domains accessible via network 131.

Domain 151 can be identified by domain name 152, such as, for example, domain name service ("DNS") name that is resolvable to an IP address. Domain name 152 can be entered to a Web browser (potentially along with other identifying information for a specified application within the domain 151) to direct a browser to request content from Web server 153. A domain name along with other identifying information can be included in a Uniform Resource Locator ("URL") entered into a Web browser. Depending on a type of request and/or a received URL, Web server 153 can access content from content 155 and/or initiate a Web-based application, such as, for example, application 191S. Application 191S can request data from other locations in domain 151, such as, for example, from database 154 (e.g., a SQL or other relational database). Web server 153 can include content from 155 and/or data from database 154 in a response to a Web browser request.

Browser cache 106 is configured to cache components included in Web-based content received from domains, including domain 151. The cached components can subsequently be made available to fulfill Web-based requests sent from Web browser 104. For example, cached components 182 can be portions of content 155 accessed directly from browser cache 106 (without the need for transporting cached components 182 via network 131) and rendered within Web browser 104.

When a Web server is attempting to respond to a request from Web browser 104, script code from the Web server can access browser cache 106 to search for locally cached components. When cached components are identified, the Web server can access the components and include the components in a response that is to be rendered within Web browser 104. Thus, browser cache 106 is generally accessible to any Web server communicating with Web browser 104. Accordingly, a Web server in one domain can access cached components in browser cache 106 that were cached for a Web server in a different domain.

On the other hand, local store access module 107 manages access to local store 108. Local store 108 is configured to store database data received in response to Web-based requests. Database data stored in local store 108 can be accessed by Web browser 104 (without the need for transporting the database data via network 131) and rendered in a Web-based application within Web browser 104. Database data can be stored in local store 108 along with an indication of the domain that sent the database data to Web browser 104.

Local store access module 107 can filter requests from script code from Web servers to access database data stored in local store 108 such that one domain is prevented from accessing another domains database data. Thus, although database data is stored in local store 108, the database data is not generally accessible to fulfill requests for any domain (in contrast to components stored in browser cache 106 which are generally accessible to Web servers from any domain).

Figure 2:
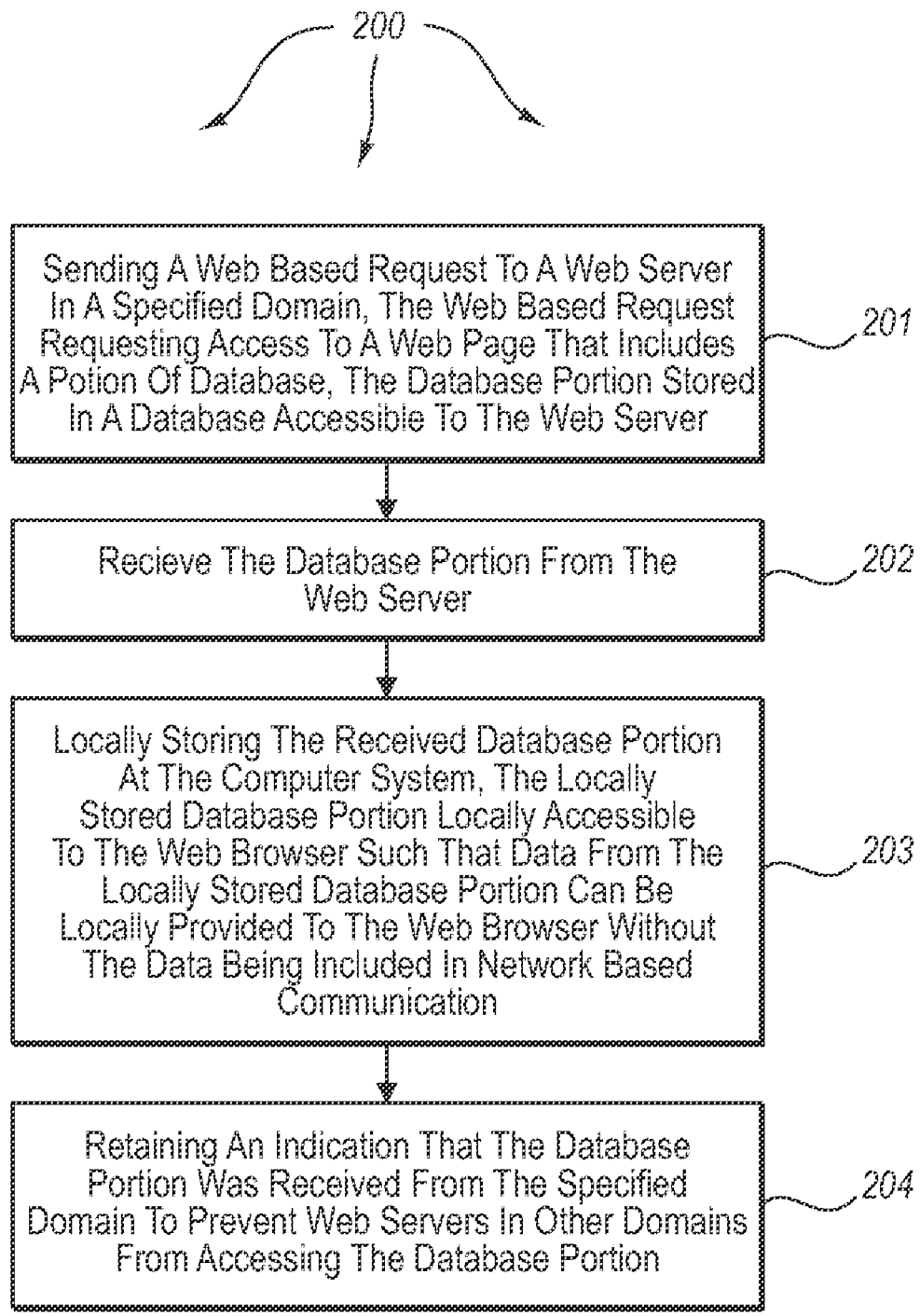
FIG. 2 illustrates a flow chart of an example method for caching tabular database data at a computer system for subsequent Web browser access.

FIG. 2 illustrates a flow chart of an example method 200 for caching tabular database data at a computer system for subsequent Web browser access. The method 200 will be described with respect to the components of computer architecture 100 depicted in FIG. 1A.

Method 200 includes an act of sending a Web based request to a Web server in a specified domain, the Web based request requesting access to a Web page that includes a portion of database data, the database portion stored in a database accessible to the Web server (e.g., through script code execution) (act 201). For example, script code of application 191C (running within browser 104) can send request 181 to Web server 153 in domain 151. Request 181 can be a request for access to a Web page that includes a portion of database 154.

Web server 153 can receive request 181 and route at least a portion of request 181 to application 191S. Application 191S can access database portion 154P from database 154 in response to receiving the request. When appropriate, Web server 153 can combine any database data accessed from database portion 154P with other content from content 155. From database portion 154P and potentially other content, Web server 153 can formulate Web page 182. Web server 153 can send Web page 182 to Web browser 104.

Web browser 104 can receive Web page 182. Web browser 104 can render some portions of content and forward any database data to application 191C. Application 191C can process and render the database data.

In response to request 181, Web server 153 can also send database portion 154P to Web browser 104.

Method 200 includes an act of receiving the database portion from the Web server (act 202). For example, Web browser 104 can receive database portion 154P included in Web page 182. Alternately, Web browser 104 can receive database portion 154P that was sent separately to Web browser 104 in response to request 181.

Method 200 includes an act of locally storing the received database portion at the computer system, the locally stored database portion being locally accessible to the Web browser such that data from the locally stored database portion can be locally provided to the Web browser without the data being included in network based communication (act 203). For example, Web browser 104 can store database portion 154P in local store 108. Accordingly, database portion 154P is locally accessible to Web browser 104 such that the locally stored database portion 154P can be provided to Web browser 104 without transferring database portion 154P via network 131.

Method 200 includes an act of retaining an indication that the database portion was received from the specified domain to prevent Web servers in other domains from accessing (e.g., through script code execution) the database portion (act 204). For example, domain name 152 can be stored along with database portion 154P in local store 108 to indicate that database portion 154P was received from domain 151. Local store access module 107 can compare the domain name associated with subsequent requests for database portion 154P to domain name 152 to determine if requests to access database portion 154P are granted.

Figure 1B:
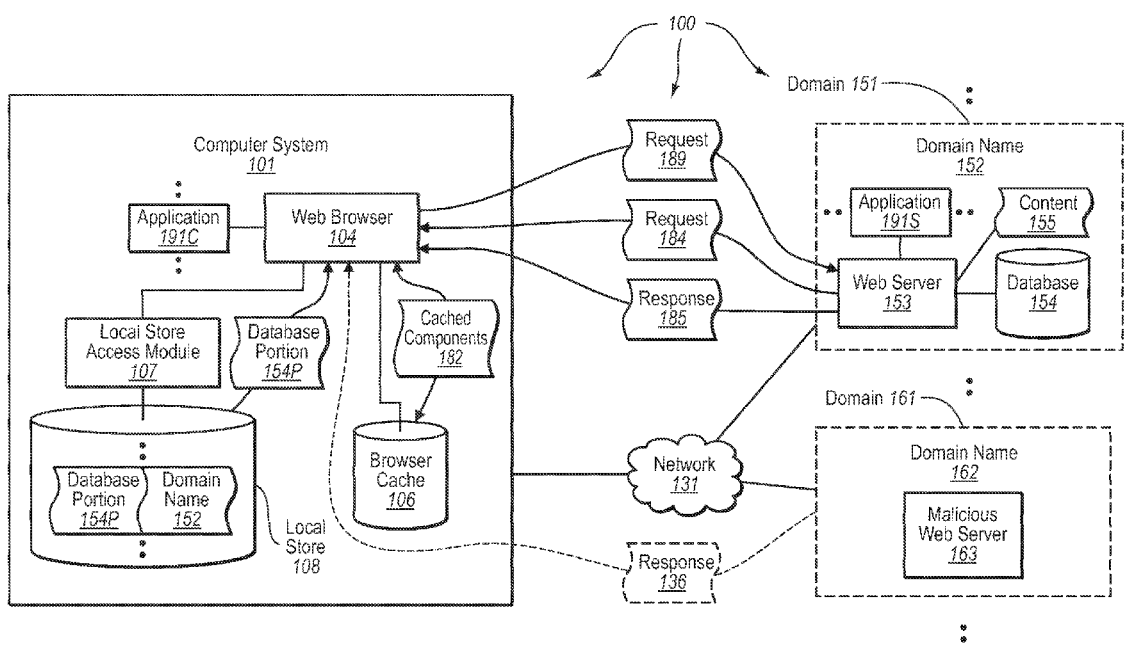

FIG. 1B illustrates example computer architecture 100 and further depicts domain 161. Domain 161 includes malicious Web server 163. Malicious Web server 163 can be configured to attempt to access cached components of other Web servers cached in browser cache 106 and to attempt to access database data from other domains stored in local store 108.

Figure 3:
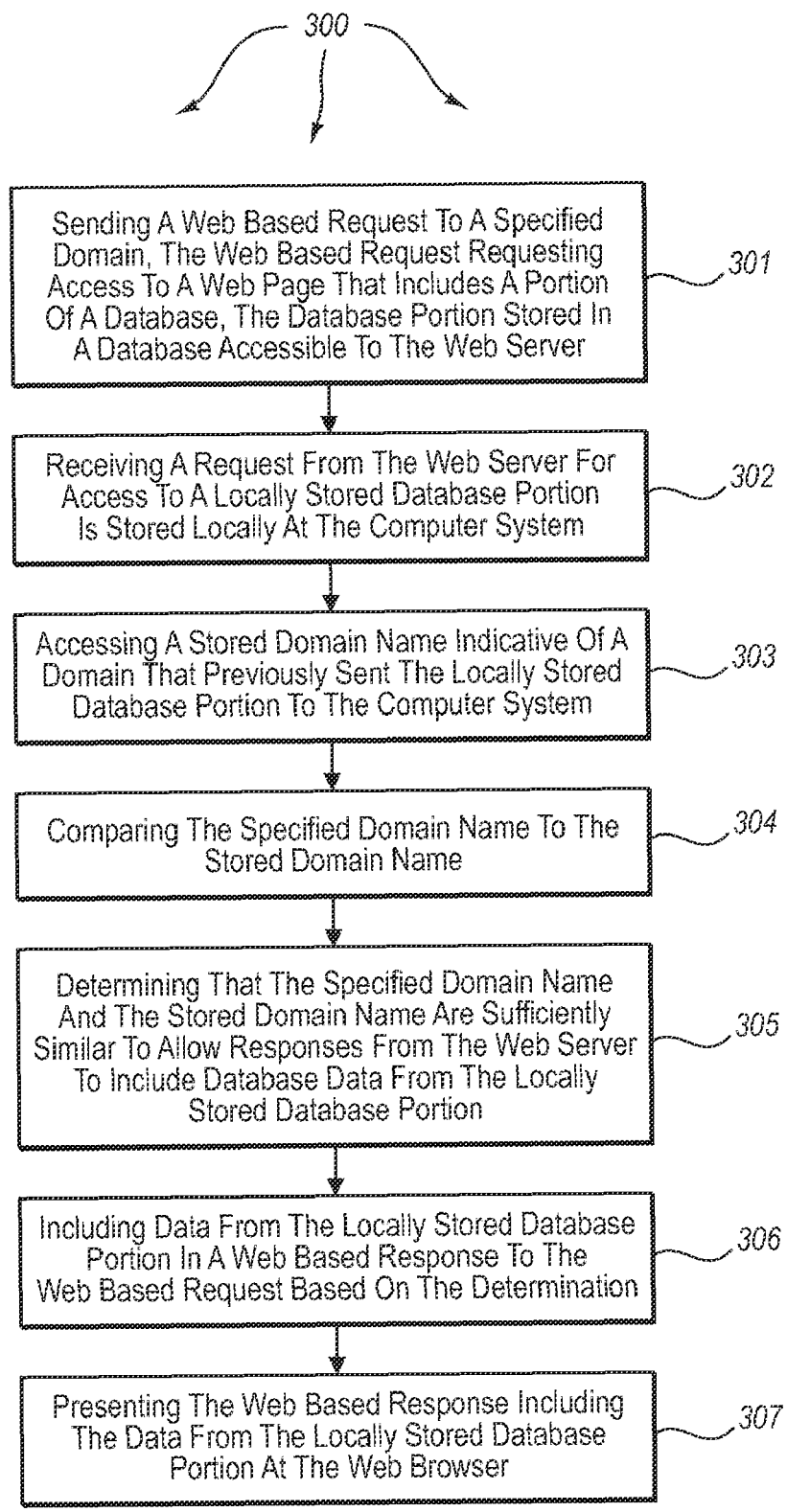
FIG. 3 illustrates a flow chart of an example method for rendering tabular database data within the Web browser.

FIG. 3 illustrates a flow chart of an example method 300 for rendering tabular database data within the Web browser. The method 300 will be described with respect to the components of computer architecture 100 depicted in FIG. 1B.

Method 300 includes an act of sending a Web based request to a Web server in a specified domain indicated by a specified domain name, the Web based request for accessing a Web page that includes a portion of a database, the database portion stored in a database accessible to the Web server (act 301). For example, Web browser 104 can send request 189 to Web server 153 in domain 151. Request 189 can be associated with a URL that includes domain name 152. Request 189 can be a request to access a Web page that includes database portion 154P from database 154.

In response to request 189, Web server 153 can send request 184 back to Web browser 104. Request 184 can be a request to access a copy database portion 154P stored in local store 108.

Method 300 includes an act of receiving a request from the Web server for access to a locally stored database portion that is stored locally at the computer system (act 302). For example, Web browser 104 can receive request 184 (e.g., included script code) requesting access to database portion 154P stored in local store 108.

Method 300 includes an act of accessing a stored domain name indicative of a domain that previously sent the locally stored database portion to the computer system (act 303). For example, local store access module 107 can access domain name 152 indicative of a Web server in domain 151 having previously sent database portion 154P to Web browser 104.

Method 300 includes an act of comparing the specified domain name to the stored domain name (act 304). For example, local store access module can compare domain name 152 (stored in local store 108) to domain name 152 (associated with request 184). Method 300 includes an act determining that the specified domain name and the stored domain name are sufficiently similar to allow responses from the Web server to include the locally stored database portion (act 305). For example, local store access module 107 can determine that domain 152 (stored in local store 108) is identical to domain name 152 (associated with request 184). However, specified rules indicating lesser degrees of similarity can be used to determine if a specified domain name and a stored domain name are sufficiently similar.

Method 300 includes an act of including data from the locally stored database portion in a Web based response to the Web based request based on the determination (act 306). For example, database portion 154P can be included in response 185 (i.e., a response to request 189) based on the results of the comparison. Method 300 includes an act of presenting the Web based response including the locally stored database portion at the Web browser (act 307). For example, database portion 154P (as well as any other Web page components included in response 185) can be presented at Web browser 104.

Embodiments of the invention can prevent a malicious server from accessing another server's locally stored database data. For example, it may be that malicious server 163 in domain 161 sends response 136 (in response to a request from Web browser 104) to Web browser 104. Response 136 can include code (scripts) that request access to database data stored in local store 108 (e.g., through execution of a script). As such, local store access module 107 can compare domain name 162 (the domain name for domain 161) to stored domain names in local store 108 (e.g., domain name 152). If domain name 162 lacks sufficient similarity to any stored domain name, no access to stored database data is given. Thus, database data from other domains, such as, for example, database portion 154P, is protected from unauthorized access. That is, when domain name 152 and domain name 162 lack sufficiently similarity, local store access module 107 does not permit requests from domain 161 to access database portion 154P sent from domain 151 and stored in local store 108

A response from a Web server can include code (scripts) from the server, such as, for example, when a user specifically communicates with a Web site. A response can also include code (scripts) from $3^{rd}$ party servers, such as, for example, when one Web site includes advertisements for another Web site.

A "malicious" Web server can be viewed as malicious from the perspective of data stored in local store 108, even when a user has legitimate reason to access a Web server. For example, a user may have bank accounts at both a first bank and a second bank. Thus, a user of computer system 101 has a legitimate (and in fact beneficial) reason to access Web sites for both the first and second banks. Further, through prior communication with the first bank's Web site, the first bank may have database data (e.g., a users account information) stored in local store 108. However, the user does not necessarily desire to give the second bank access to the first bank's locally stored database data. The domain name check can prevent scripts from the second bank from accessing the first bank's locally stored database data.

Accordingly, embodiments of the present invention can be used to "sandbox" locally stored Web-based database data per domain.

Figure 1C:
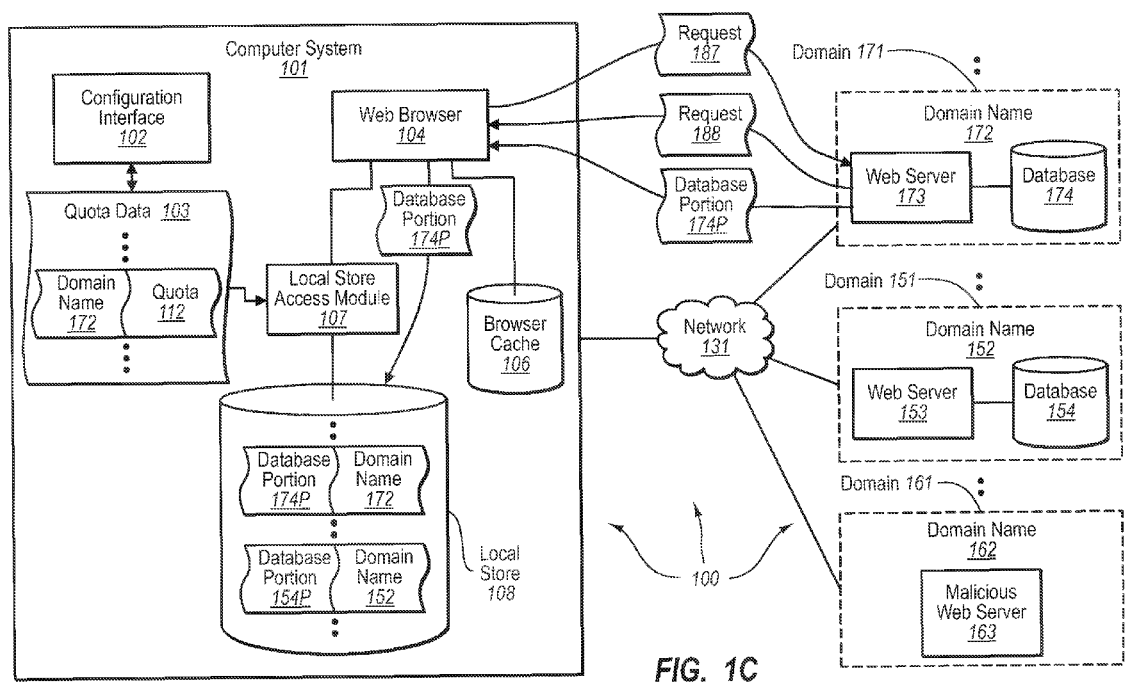
Figure 4:
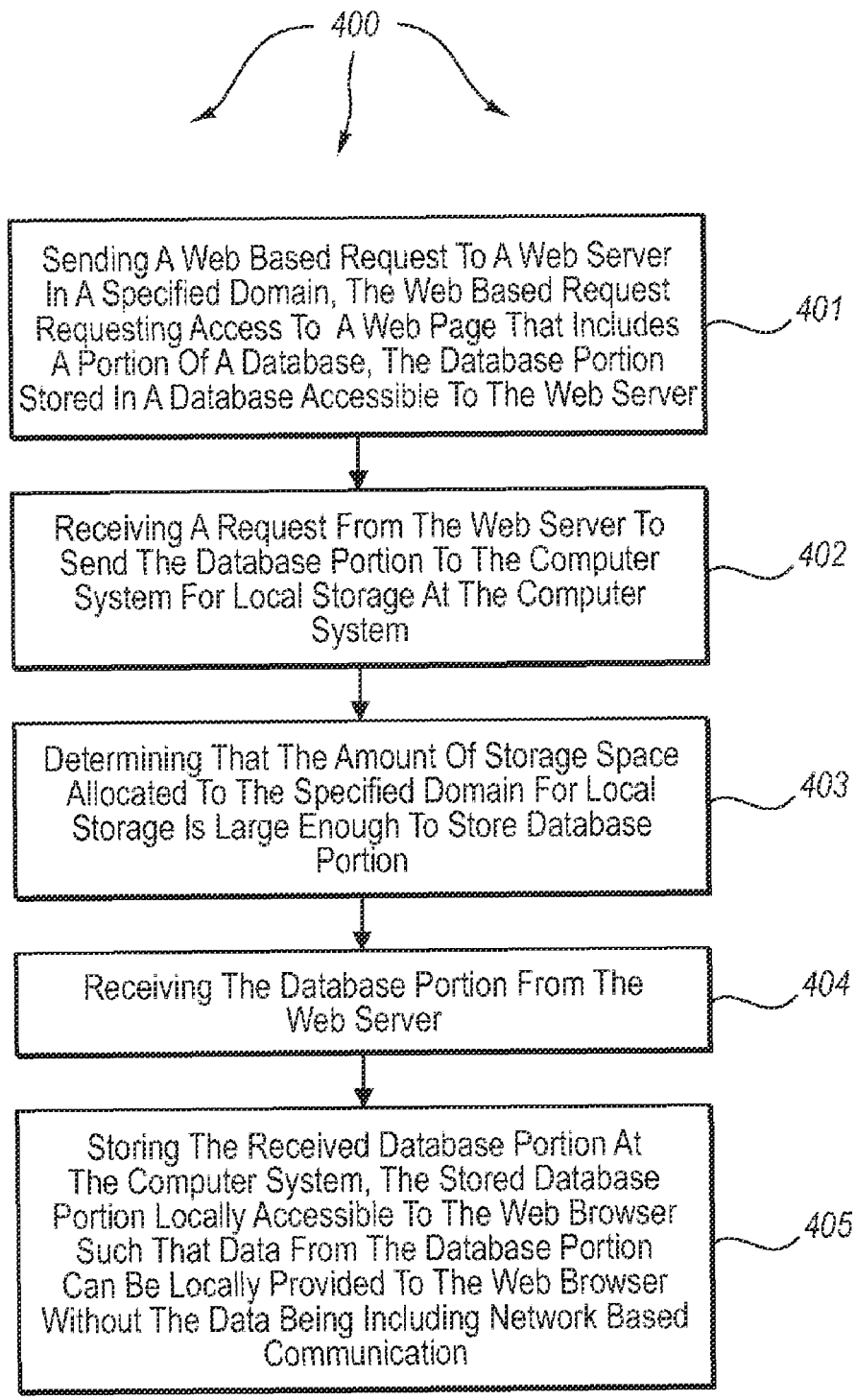
FIG. 4 illustrates a flow chart of another example method for caching tabular database data at the computer system for subsequent Web browser access.

FIG. 1C illustrates example computer architecture 100 and further depicts domain 171. Domain 171 includes malicious Web server 173 and database 174. Similar to Web server 153, Web server 173 can be associated with one or more distributed applications and have access to other Web based content. FIG. 4 illustrates a flow chart of another example method for caching tabular database data at the computer system for subsequent Web browser access. The method 400 will be described with respect to the components of computer architecture 100 depicted in FIG. 1C.

Method 400 includes an act of sending a Web based request to a Web server in a specified domain, the Web based request requesting access to a Web page that includes a portion of a database, the database portion stored in a database accessible to the Web server (act 401). For example, Web browser 104 can send request 187 to Web server 173. Request 187 can include a request for access to a Web page that includes a portion of database 174.

Web server 173 can receive request 187 and route at least a portion of request 181 to distributed application. The distributed application can access data from database 174 (e.g., database portion 174P) in response to receiving the request. When appropriate, Web server 153 can combine any database data accessed from database 174 with other content. From the database data and potentially other content, Web server 153 can formulate and send a Web page to return to Web browser 174.

Web browser 104 can receive the Web page. Web browser 104 can render some portions of content and forward any database data to a distributed application The distributed application can process and render the database data.

In response to request 187, Web server 173 can send request 188 to Web server 104. Request 188 can be a request to send database portion 174P to computer system 101 for storage in local store 108.

Method 400 includes an act of receiving a request from the Web server to send the database portion to the computer system for local storage at the computer system (act 402). For example, Web browser 104 can receive request 188 from Web server 133.

Method 400 includes an act of determining that the amount of storage space allocated to the specified domain for local storage is large enough to store the database portion (act 403). For example, in response to request 188, local store access module 107 can refer to quota data 103 to determine the amount of storage space allocated to domain 171. Local store access module 107 can scan entries in quota data 103 for a specified domain name. For example, local store access module 107 can scan entries in quota data 103 for domain name 172 (the domain name for domain 171). When an entry is found to include a specified domain name, local store access module 107 can refer to the corresponding storage space quota for the domain. For example, local store access module 107 can refer to quota 112 to identify the storage space allocated to domain 171 for storing database data in local store 108.

Local store access module 107 can subtract the amount of storage space currently used by domain 171 from quota 112 to calculate the remaining amount of storage space available to domain 171 for storing database data. When the size of database portion 174P is less than or equal to the remaining amount of storage space available to domain 171, local store access module 107 permits storage of database portion 174P along with domain name 172 in local store 108.

On the other hand, when the size of database portion 174P is greater than the remaining amount of storage space available to domain 171, local store access module 107 can prevent database portion 174P from being stored in 108. Alternately, when size of database portion 174P is greater than the remaining amount of storage space available to domain 171, a notification can be presented to a user giving the user an opportunity to increase the quota for domain 171.

For example, configuration interface 102 can present a notification at computer system 101 when storage of database portion 174P would cause quota 112 to be exceeded. The notification can include user-interface controls for initially setting as well as altering the value of quota 112. If a user increases quota 112 an appropriate amount, local store access module 107 can subsequently permit storage of database portion 174P along with domain name 172 in local store 108.

When local store access module 107 permits storage of database data in store 108, Web browser 104 can send this information to a requesting Web server. For example, Web browser 104 can notify Web server 173 that Web server 173 has sufficient remaining storage space to store database portion 174P in local store 108. In response, Web server 173 can send database portion 174P to Web browser 104.

Method 400 includes an act of receiving the database portion from the Web server (act 404). For example, Web browser 104 can receive database portion 174P from Web server 173. Method 400 includes an act of storing the database portion at the computer system, the stored database portion locally accessible to the Web browser such that data from the database portion can be locally provided to the Web browser without the data being including network based communication (act 405). For example, Web browser 104 can store database portion 174P in local store 108. Accordingly, database portion 174P is locally accessible to Web browser 104 such that the locally stored database portion 174P can be provided to Web browser 104 without transferring database portion 174P via network 131.

Accordingly, embodiments of the present invention permit Web-based database data to be locally stored at a computer system to increase the efficiency of rendering the Web-based database data within a Web browser at the computer system. Web-based database data can be sandboxed per domain to mitigate (and possibly eliminate) the exposure of the Web-based database data to malicious computer systems. Space allocated to each domain can be initially set and then subsequently altered by a user.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system including a Web browser, a browser cache, a local store access module, and a controlled access local store, the Web browser for browsing Web-based content, the contents of the browser cache fully accessible to any Web server in communication with the Web browser, the local store access module controlling access to contents of the controlled access local store based on domains associated with Web server requests to access the contents of the controlled access local store, the controlled access limiting further access to each portion of content in the local access store to requests from the domain that initially sent the portion of content for storage in the controlled access local store, a method for caching database data at the computer system for subsequent Web browser access, the method comprising:

an act of sending a Web based request to a Web server in a specified domain, the Web based request requesting access to a Web page that includes a portion of a database and other content, the database portion stored in a database accessible to the Web server;

an act of receiving the requested Web page from the Web server, the Web page including the database portion and the other content;

an act of caching the other content in the browser cache;

an act of storing the database portion in the controlled access local store such that data contained in the stored database portion can be locally provided to the Web browser without the data being included in network based communication; and an act of retaining an indication that the database portion was received from the specified domain so that the local store access module can limit access to the database portion stored in the controlled access local store, the limited access including:

permitting requests from Web servers in the specified domain to access the database portion for use in Web pages presented at the Web browser; and preventing requests from Web servers in other domains from accessing the database portion.

2. The method as recited in claim 1, wherein the act of sending a Web based request to a Web server comprises an act of sending an HTTP request.

3. The method as recited in claim 1, wherein the act of sending a Web based request to a Web server comprises an act of sending a Web based request that includes communication from a portion of a distributed application at the computer system to another portion of the distributed application in the specified domain.

4. The method as recited in claim 1, wherein the act of receiving the database portion from the Web server comprises an act of receiving a portion of a relational database.

5. The method as recited in claim 1, wherein the act of locally storing the database portion in the controlled access local store comprises an act of storing the received database portion in a location accessible to script code from the Web server so that the script code from the Web server can access the local database portion to fulfill Web-based requests from the Web browser without transferring the local database portion from the Web server.

6. The method as recited in claim 1, wherein the act of storing the database portion in the controlled access local store comprises an act of storing the received database portion in a location accessible to script code from the Web server so that data can be used to fulfill Web-based requests without having to transfer the data over Internet.

7. The method as recited in claim 1, wherein the act of retaining an indication that the database portion was received from the specified domain comprises an act of locally storing the specified domain name along with the database portion in the controlled access local store.

8. The method as recited in claim 1, further comprising prior to storing the database portion in the controlled access local store, an act of determining that the amount of storage space allocated to the specified domain for local storage in the controlled access local store is large enough to store the database portion.

9. At a computer system including a Web browser, a browser cache, a local store access module, and a controlled access local store, the Web browser for browsing Web-based content, the contents of the browser cache fully accessible to any Web server in communication with the Web browser, the local store access module controlling access to contents of the controlled access local store based on domains associated with Web server requests to access the contents of the controlled access local store, the controlled access limiting further access to each portion of content in the local access store to requests from the domain that initially sent the portion of content for storage in the controlled access local store, a method for rendering tabular database data within the Web browser, the method comprising:

an act of receiving a prior Web page from a Web server in a domain identified by a domain name, the prior Web page including a database portion and other content, the prior Web page received in response to a prior Web based request sent to the Web server;

an act of storing the database portion in the controlled access local store such that data contained in the stored database portion can be locally provided to the Web browser without the data being including in network based communication;

an act of storing the domain name to retain an indication that the domain initially sent the stored database portion to the computer system;

an act of sending a Web based request for accessing another Web page that includes data from the stored database portion and further content;

an act of receiving a request from another Web server for access to the locally stored copy of the database portion, stored in the controlled access local store, the request indicating that the other server is in a specified domain identified by a specified domain name;

an act of accessing the stored domain name;

an act of the local store access module comparing the specified domain name to the stored domain name;

an act of the local store access module determining that the specified domain name and the stored domain name are sufficiently similar to allow the Web server access to the stored database portion;

an act of the local store access module permitting the Web server request to access to the stored database portion based on the determination;

an act of formulating the Web page from data in the stored database portion and at least a portion of the further content, the Web page formulated in response to the Web based request and the determination, formulation of the Web page from data in the stored database portion reducing network traffic without exposing the stored database portion to Web servers in other domains; and an act of presenting the Web page at the Web browser.

10. The method as recited in claim 9, wherein the act of sending a Web based request to a Web server comprises an act of sending a Web based request that includes communication from a portion of a distributed application at the computer system to another portion of the distributed application in the specified domain.

11. The method as recited in claim 9, wherein the act of accessing a stored domain name indicative of a domain comprises an act of accessing a Domain Name Services ("DNS") name.

12. The method as recited in claim 9, wherein the act of comparing the specified domain name to the stored domain name comprises an act of determining that the specified domain name and the stored domain name are identical.

13. At a computer system including a Web browser, a browser cache, a local store access module, and a controlled access local store, the Web browser for browsing Web-based content, the contents of the browser cache fully accessible to any Web server in communication with the Web browser, the local store access module controlling access to contents of the controlled access local store based on domains associated with Web server requests to access the contents of the controlled access local store, the controlled access limiting further access to each portion of content in the local access store to requests from the domain that initially sent the portion of content for storage in the controlled access local store, a method for caching tabular database data at the computer system for subsequent Web browser access, the method comprising:

an act of sending a Web based request to a Web server in a specified domain, the Web based request requesting access to a Web page that includes a portion of database data and other content, the database portion stored in a database accessible to the Web server;

an act of receiving a request from the Web server to send the database portion to the computer system for storage in the controlled access local store so that the local store access module can control access to the database portion;

an act of determining that the amount of storage space allocated to the specified domain for local storage in the controlled access local store is large enough to store the database portion;

an act of receiving the database portion from the Web server;

an act of storing the received database portion in the controlled access local store such that data contained in the stored database portion can be locally provided to the Web browser without the data being including network based communication; and an act of retaining an indication that the database portion was received from the specified domain so that the local store access module can limit access to the database portion stored in the controlled access local store, the limited access including:

permitting requests from Web servers in the specified domain to access the database portion for use in Web pages presented at the Web browser; and preventing requests from Web servers in other domains from accessing the database portion.

14. The method as recited in claim 13, wherein an act of determining that the amount of storage space allocated to the specified domain for local storage is large enough to store the database portion comprises referring to user-configurable quota data for the specified domain.

15. The method as recited in claim 13, wherein an act of determining that the amount of storage space allocated to the specified domain for local storage is large enough to store the database portion comprises receiving an indication that an initial user setting allocated enough storage space to the specified domain to permit storage of the database portion.

16. The method as recited in claim 13, further comprising:

an act of determining that the amount of storage space allocated to the specified domain for local storage is not large enough to store the database portion prior to determining that the amount of storage space allocated to the specified domain for local storage is large enough to store the database portion; and an act of presenting a notification at the computer system, the notification indicating that the amount of storage space allocated to the specified domain for local storage is not large enough to store the database portion.

17. The method as recited in claim 16, further comprising:

an act of receiving an indication that a user has increased to the storage space allocated to the specified domain for local storage prior to determining that the amount of storage space allocated to the specified domain for local storage is large enough to store the database portion.

18. The method as recited in claim 13, wherein the act of receiving the database portion from the Web server comprises an act of receiving a portion of an SQL database.

19. The method as recited in claim 13, wherein the act of storing the received database portion in the controlled access local store comprises an act of storing the database portion so that data from the database portion can be used to fulfill Web-based requests without transferring data from the database over the Internet.

* * * * *